Dec. 26, 1933. A. C. LINDGREN ET AL 1,941,013
TRACTOR PLOW
Filed March 16, 1933 2 Sheets-Sheet 1
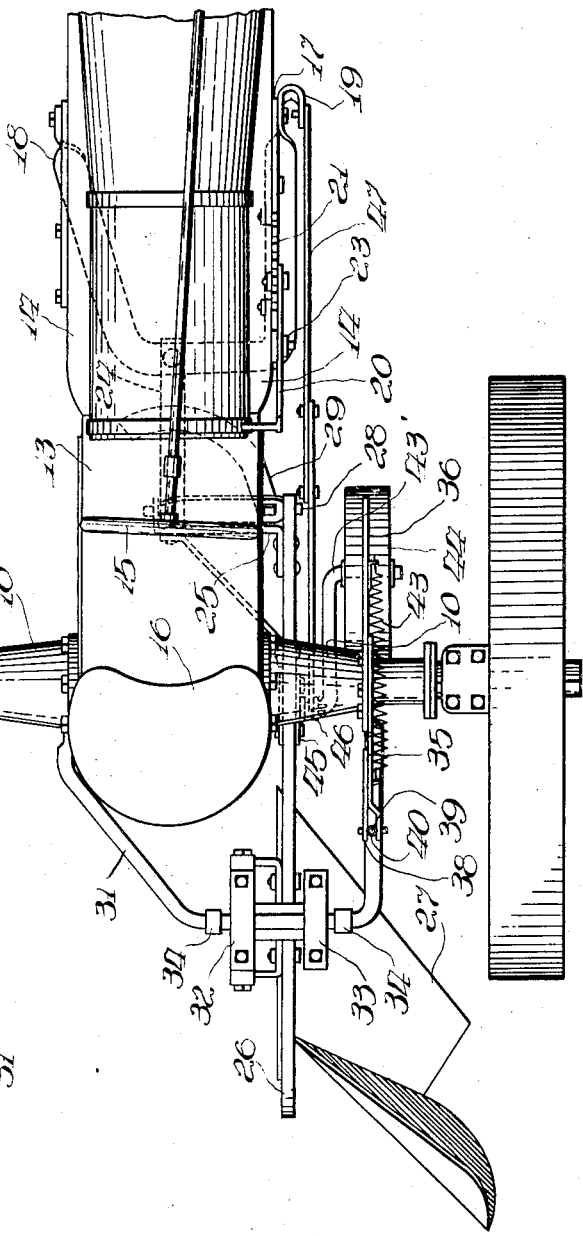
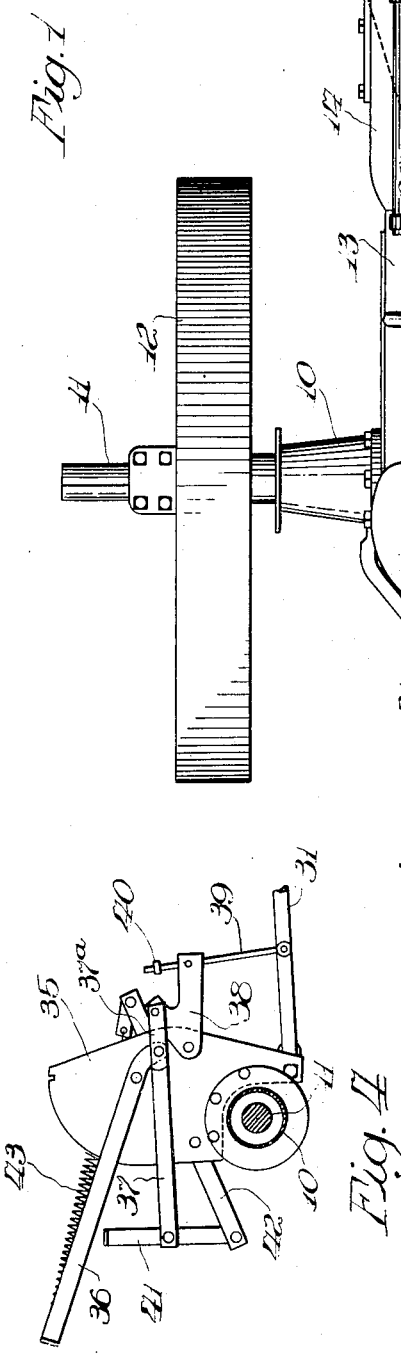
Inventors
Alexis C. Lindgren
Glen J. Olson
By W. Daniel Atty.

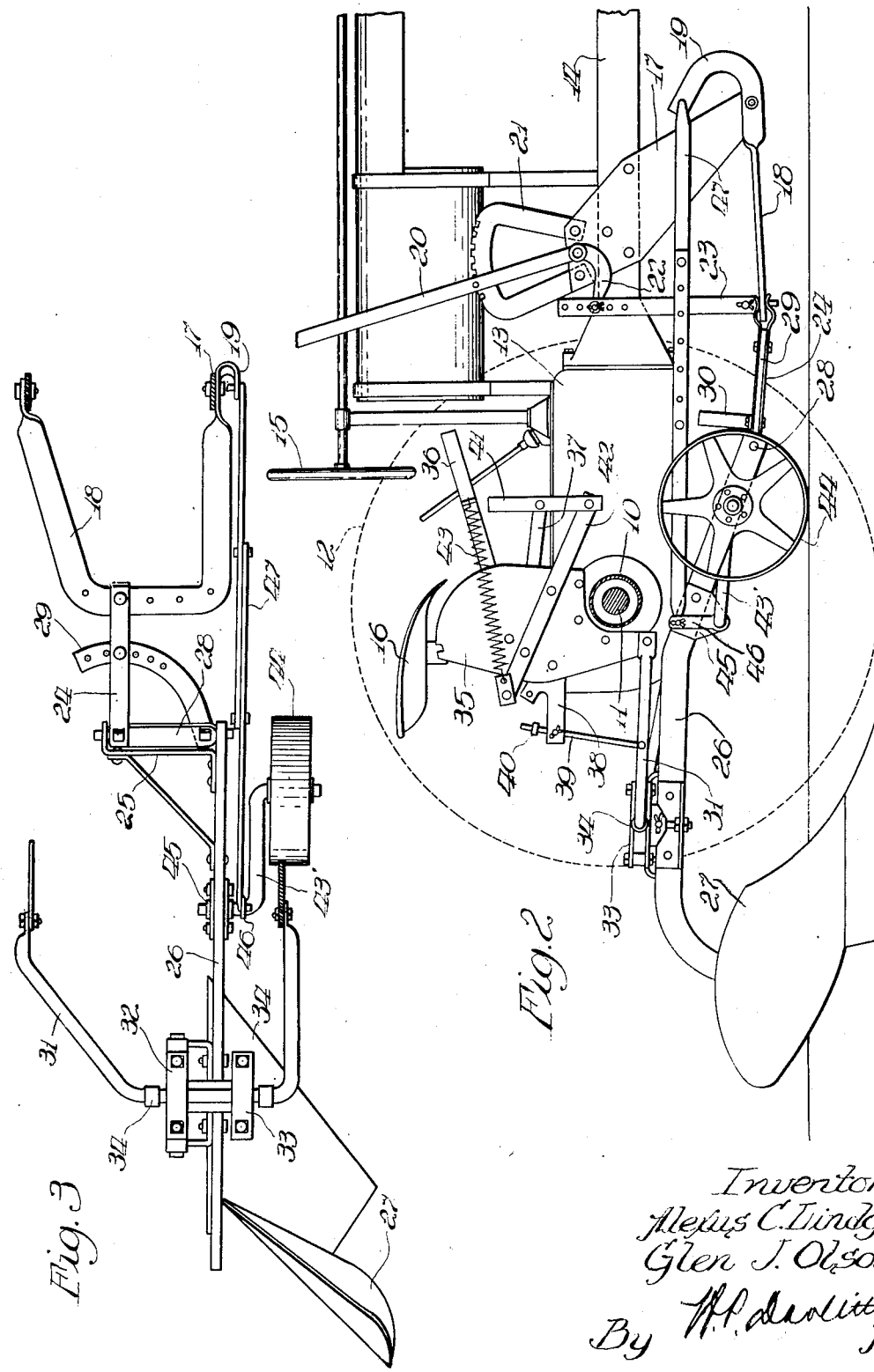

Patented Dec. 26, 1933

1,941,013

UNITED STATES PATENT OFFICE 1,941,013

TRACTOR PLOW

Alexus C. Lindgren, Chicago, and Glen J. Olson, Canton, Ill., assignors to International Harvester Company, a corporation of New Jersey Application March 16, 1933. Serial No. 661,004

6 Claims. (Cl. 97—47)

The present invention relates to tractor plows, and in particular to the manner of connecting the plow to the tractor.

In tractor connected plows it is desirable that the plow be merely pulled by the tractor while plowing, so that up and down movements of the tractor as its wheels pass over uneven surfaces will not affect the plow. This requires that the plow shall carry its own depth gauging means and it is desirable that such means shall be readily adjustable by a device on the tractor within convenient reach of the operator's station thereon.

It is the primary object of this invention to meet these requirements by simple and efficient means and to provide connections between the plow and tractor which will embody means for causing appropriate adjustment of the depth gauge on the plow as the hitch of the plow to the tractor is raised or lowered. More specifically, the main object is to cause the gauge wheel on a plow beam to be raised relatively to the beam when the hitch of the plow is lowered, and vice versa, and also for the gauge wheel to be similarly raised when the plow as a whole is lifted for transport.

The foregoing and other objects, which will be evident to those skilled in the art, are attained by the structure hereinafter described and claimed, and illustrated in the accompanying drawings, where:

Figure 1 is a plan view of the rear portion of a tractor having a plow connected thereto;

Figure 2 is a side view of the same;

Figure 3 is a detail plan view of the plow parts and hitch viewed separately from the tractor; and, Figure 4 is a detail view of the plow lifting mechanism.

The invention is illustrated in connection with a tractor having a rear axle housing 10 from which the differentially driven axle shafts 11 project. The shafts 11 have the traction wheels 12 adjustably secured thereto in any suitable manner. The tractor includes a forwardly extending body portion 13 including side sills 14 which extend to the front end of the tractor, which is supported on dirigible steering wheels, not shown. The dirigible wheels are controlled through a steering wheel 15 located adjacent the operator's seat 16.

In the practice of the present invention, a depending hanger member 17 is bolted or otherwise clamped to each sill member 14 at about the middle of the tractor, as seen in Figures 1 and 2. The hanger members are preferably inclined forwardly and at their lower ends they have pivoted thereto the arms of a rearwardly extending U-shaped drawbar 18. One of the arms of the drawbar 18 is extended upwardly, as at 19, to provide an upright arm, the upper end of which lies above the plane of the drawbar proper. One of the hanger members 17, at its upper end, has mounted thereon, a hand lever 20 and its locking rack 21. This lever is provided with an angular, rearwardly extending arm 22, to which a supporting link 23 is adjustably connected. At its lower end the link 23 is pivotally connected to the drawbar 18. By this arrangement, movement of lever 20 will serve to adjust the drawbar vertically, as will be obvious. As best seen in Figure 3, the drawbar has pivotally connected to it at any selected point on its transverse portion, a coupling link 24. The coupling link 24 is connected at its rear end to a draft bracket 25 fixed on the inner side of the forward end of a plow beam 26, which extends under the axle housing of the tractor and carries the usual plow bottom 27. The connection between the link 24 and the bracket 25 is through a transverse pivot member 28 which has one end supported in a forwardly extending lug on the bracket 25 and its other end received in a suitable opening in the front end of the plow beam. In order to provide for angular adjustment of the plow and beam, an arcuate link or arm 29 adjustably connect the coupling link 24 with a laterally spaced point on the member 28. The connection between the coupling link 24 and the drawbar 18 is such as to permit free lateral and vertical movement of the plow with respect to the tractor, but the range of vertical movement of the coupling link and, therefore, of the forward end of the plow beam, is preferably limited, as by an upstanding stop or abutment member 30 carried by the member 28, in position to contact the bottom of the tractor body. To raise and lower the plow from and to operating position, the axle housing of the tractor has pivotally connected thereto a rearwardly extending bail 31, the bight portion of which is loosely seated between laterally spaced pairs of straps 32 and 33 secured above the plow beam near its rear end. Stop collars 34 at each side of the straps prevent excessive lateral movement of the plow. Vertical swinging movement of the bail 31 serves to raise and lower the plow and this swinging movement of the bail is effected in this instance by a combined hand and foot lift device mounted on the axle structure of the tractor. The lift device is carried on a vertical plate 35 secured to and extending above the axle housing at one side of the operator's seat. This plate has pivoted to it on its inner face, an upwardly extending hand lever 36, which is pivotally connected to a substantially horizontal link 37. A short link 37a is pivoted to the lower end of lever 36 and to the shorter upwardly extended arm of a bell crank lever 38 pivoted on the plate 35 below the hand lever. The longer arm of the bell crank lever extends rearwardly and carries a swiveled eye which slidably receives the upper end of a lifting link 39 pivoted on one arm of the bail 31. A stop nut 40 on the upper end of this link serves to lift or swing the bail upwardly when engaged by the eye on the lever 38. When the bail is lowered, the stop 40 is left sufficiently above the lever 38 to permit floating movement of the bail and its connected plow beam. At its forward end the link 37 is pivoted at the middle of a pedal lever 41, the lower end of which is pivoted on a fixed supporting bar 42 riveted to the outer face of the plate 35. The other end of this bar 42 may serve as an anchorage for a coil spring 43, the other end of which is connected to the hand lever 36 to assist the lift. With this arrangement, it will be seen that, when the lever 36 is swung rearwardly from its position in Figures 2 and 4, and the foot pedal lever 41 is simultaneously pushed forwardly, the bell crank lever 38 will be swung upwardly and the plow thereby raised from the ground for transport, the pivotal movement of the plow taking place on the member 28. Reverse movement of the lever 36 will, of course, lower the plow.

As the connections described permit free movement of the plow with respect to the tractor, it is necessary that it be supported in such a manner as to maintain a fixed plowing depth. For this purpose, the forward end of the plow has journaled thereon a cranked axle 43′, the lower crank of which has journaled thereon, a gauge wheel 44, in advance of the plow bottom 27. The upper crank or arm of this axle is journaled in suitable bracket members 45 depending from the plow beam, and has secured thereto an upright arm 46. The arm 46 is connected to the upstanding arm 19 on the drawbar by means of a link 47, which is preferably formed of relatively adjustable, overlapped sections bolted to each other, as shown in Figures 2 and 3. This link, it will be seen, maintains a fixed distance between the arm 46 on the crank axle 43′ and the arm 19 on the drawbar. Therefore, when the drawbar is adjusted upwardly by the lever 20, a pull is exerted on the link 47 and the crank axle 43′ is swung downwardly, thereby lowering the gauge wheel 44 to decrease the depth of plowing. Lowering of the draft bar will correspondingly raise the gauge wheel and allow the plow to go deeper. It will also be seen that, when the plow is lifted for transport movement of the plow about its hitch, pivot will cause the arm 46 to be thrust rearwardly to some degree, as the drawbar 18 remains stationary, thereby swinging the gauge wheel upwardly on the beam; thus affording greater clearance for transport purposes.

It will accordingly be clear that the novel arrangement described provides a freely floating plow attachment including a depth gauge carried on the plow and adjustable by means of mechanism mounted on the tractor and acting on the gauge means through vertical adjustments imparted to the draft connections between the plow and tractor. It is accordingly unnecessary to provide a separate adjusting device for the gauge wheel as has heretofore been the practice.

The specific construction herein described and illustrated is obviously capable of some modifications without departure from the scope of the invention as defined in the following claims.

What is claimed is:

1. A tractor plow connection comprising the combination of a tractor, a plow having a beam supported on a vertically adjustable ground engaging gauge member, a vertically adjustable drawbar on the tractor to which the plow beam is coupled, and means whereby vertical ajustment of the drawbar effects corresponding adjustment of the gauge member.

2. A tractor plow connection comprising the combination of a tractor, a plow having a beam supported on a vertically adjustable gauge wheel, a vertically adjustable drawbar on the tractor to which the gauge wheel is coupled, means on the tractor for adjusting the drawbar, and means connecting the gauge wheel and drawbar for adjusting the gauge wheel in an opposite direction to the adjustment of the drawbar.

3. A tractor plow connection comprising the combination with a tractor of a drawbar pivoted on the tractor for vertical adjustment, a plow including a beam flexibly coupled to the drawbar, a cranked axle journaled on the plow beam for swinging movement vertically and carrying a gauge wheel, an arm fixed to the axle, and a link pivotally connecting said arm with the drawbar at a point adjacent the pivotal connection between the drawbar and tractor and above the horizontal plane of the drawbar.

4. A tractor plow connection comprising the combination with a tractor of a rearwardly extending drawbar pivoted on the tractor for vertical adjustment, means on the tractor for adjusting the drawbar, an upright arm on the drawbar adjacent the axis of said pivotal connection, a plow including a beam having its forward end flexibly coupled to the drawbar, a cranked axle journaled on the forward portion of the plow beam for swinging movement vertically, an upright arm fixed to the axle, and a link pivotally connecting said arm with the upright arm on the drawbar.

5. A tractor plow connection comprising the combination with a tractor having a rear axle housing and a body extending forwardly therefrom, of laterally spaced hangers secured to said body and depending therefrom forward of the axle housing, a rearwardly extending U-shaped drawbar having its arms pivoted to the lower ends of said hangers and having one of its arms extended upwardly of said point of pivotal connection, a vertically adjustable link connecting the rear end of the drawbar with the upper portion of one of said hangers, a plow including a beam extending under the axle housing and having its forward end flexibly connected to the drawbar, a cranked axle journaled on the forward portion of the plow beam for swinging movement vertically, an upright arm fixed on said axle, and a link pivotally connecting said arm with the upward extension on the drawbar.

6. A tractor plow connection comprising the combination with a tractor having a rear axle housing and a body extending forwardly therefrom, of laterally spaced hangers secured to said body and depending therefrom forward of the axle housing, a rearwardly extending U-shaped drawbar having its arms pivoted to the lower ends of said hangers and having one of its arms extended upwardly of said point of pivotal connection, means for holding the drawbar at adjusted position, a plow including a beam extending under the axle housing and having its forward end flexibly connected to the drawbar, means on the rear of the tractor for lifting and lowering the plow, a cranked axle journaled on the forward portion of the plow beam for swinging movement vertically, an upright arm fixed on said axle, and a link pivotally connecting said arm with the upward extension on the drawbar.

ALEXUS C. LINDGREN.
GLEN J. OLSON.